United States Patent [19]
Ulbrich et al.

[11] Patent Number: 5,601,330
[45] Date of Patent: Feb. 11, 1997

[54] VEHICLE ROOF WITH TWO COVER ELEMENTS

[75] Inventors: Thomas Ulbrich, Kaufering; Thomas Wikelski, Schlagenhofen; Johann Mayer, Petershausen; Olaf Kraschienski, München; Christian Toduta, Germering, all of Germany

[73] Assignee: Webasto Karosseriesysteme GmbH, Germany

[21] Appl. No.: 594,236

[22] Filed: Jan. 30, 1996

[30] Foreign Application Priority Data

Feb. 15, 1995 [DE] Germany ............... 195 05 006.1

[51] Int. Cl.[6] ............... B60J 7/053; B60J 7/22
[52] U.S. Cl. ............... 296/217; 296/222; 296/223; 296/224
[58] Field of Search ............... 296/217, 222–224

[56] References Cited

U.S. PATENT DOCUMENTS 4,619,480  10/1986  Motoyama et al. ............... 296/217
4,684,168   8/1987  Lupo ............... 296/217

FOREIGN PATENT DOCUMENTS 4200724  12/1992  Germany.
4040825   5/1994  Germany.
 257622  10/1989  Japan ............... 296/217

Primary Examiner—Dennis H. Pedder
Attorney, Agent, or Firm—Sixbey, Friedman, Leedom & Ferguson, P.C.; David S. Safran

[57] ABSTRACT

A vehicle roof with two cover elements (2, 3) which selectively close or at least partially expose a roof opening. The front cover element is formed as a wind deflector strip (2) which can be pivot around a pivot axis forming pin (4) located near its front edge and which can be raised at its rear edge above the fixed vehicle roof (1). The rear cover element is designed as sliding cover (3) which can be lowered under the fixed vehicle roof (1) by means of a lowering mechanism and which can be moved under the fixed vehicle roof (1) on slide elements (20, 33) which can be moved along guide rails (18) which are secured to the roof. The wind deflector strip (2) and sliding cover (3) can be actuated by means of a common drive (drive cable 27). At each lateral side of the roof, the sliding cover (3) has front and rear slide elements (20, 33) to which the lowering mechanism is coupled for forced actuation of the two cover elements which, however, is independent of time. Furthermore, there are front and rear auxiliary slide elements (13, 26) which can move relative to the front and rear slide elements (20, 33) and which can be coupled automatically to the respective slide element (20, 33) or to a part secured to the fixed vehicle roof (guide rail 18) by means of locking blocks (15, 30) which can move perpendicularly to the direction of movement of slide elements (20, 33). At the same time, the raising mechanism (6) of the wind deflector strip (2) is coupled to the front auxiliary slide element (13).

10 Claims, 7 Drawing Sheets

VEHICLE ROOF WITH TWO COVER ELEMENTS

BACKGROUND OF THE INVENTION

1. Field of the Invention

The invention relates to a vehicle roof with two cover elements which selectively close or at least partially expose a roof opening, of which the front cover element is formed as a wind deflector strip which can be swung around a pivot axis located near its front edge and which can be raised at its rear edge over the fixed vehicle roof, and of which the rear cover element is designed as a sliding cover which can be lowered under the fixed vehicle roof by means of a lowering mechanism and which can be moved to under the fixed vehicle roof on slide elements which can be moved along guide rails which are secured to the roof, and in particular, where the wind deflector strip and sliding cover can be actuated by means of a common drive.

2. Description of Related Art

From U.S. Pat. No. 4,684,168, a generic vehicle roof is known in which the front cover element can be raised by a spring which is located in the area of its pivot axis and against whose pressure it can be lowered by a slide element of the sliding cover. The disadvantage of this arrangement is that the wind deflector strip is held simply by the force of the spring in the raised state, so that the spring, in order to be able to withstand even strong wind forces, must be made correspondingly strong; however, this is disadvantageous when the wind deflector strip is closed because of the increased drive forces which must be applied. The same applies to another generic embodiment of a vehicle roof which is disclosed in German Patent No. DE 40 40 825 C2.

In a different context, of a vehicle roof having a single cover panel, providing individual locking blocks for phased interlocking of a slide element of a movable cover part to a part secured to the roof is known, for example, from German Patent DE 42 00 724 C1.

SUMMARY OF THE INVENTION

The primary object of this invention is to design a vehicle roof with two cover elements which selectively close or at least partially expose a roof opening, such that the wind deflector strip forming the front cover element is positively controlled by a single drive during its raising and lowering movement.

This object is achieved by the sliding cover having front and rear slide elements to which the lowering mechanism is coupled, and furthermore, by front and rear auxiliary slide elements, which can move relative to the front or rear slide elements and which can be coupled automatically to a respective slide element or to a part secured to the roof by means of locking blocks which can move perpendicularly to the direction of movement of slide elements, at the same time, the raising mechanism of the wind deflector strip being coupled to the front auxiliary slide element. By providing front and rear auxiliary slide elements which can be coupled by locking blocks to a front or rear slide element of the sliding cover or to a part secured to the roof and by coupling the raising mechanism of the wind deflector strip to the front auxiliary slide element, forced activation of the two cover elements which is, however, independent of the course of movement is enabled by a single joint drive, eliminating any spring means. By selectively coupling the locking blocks to a part secured to the roof, a secure locking of the wind deflector strip in the raised position and locking of the entire openable vehicle roof in the closed position are ensured at the same time.

According to one advantageous embodiment, the front slide element is provided with a guide for the lowering mechanism of the sliding cover which has an idle path for the relative movement of the front auxiliary slide element.

It is, furthermore, advantageous that a front locking block, when the roof is completely closed, joins the front auxiliary slide element to the front slide element, and when the wind deflector strip is fully raised, releases this interlock and interlocks the front auxiliary slide element to a part which is secured to the roof. By joining to the fixed roof in the completely raised state of the wind deflector strip, the latter is also always stably supported even when decoupled from the mechanism of the sliding cover.

According to another advantageous embodiment, there is a rear locking block which, when the sliding cover is completely closed, interlocks the rear slide element to the part secured to the roof, and when the wind deflector strip is fully raised, releases this interlock and interlocks the rear auxiliary slide element to the rear slide element. In this way, the sliding cover is especially stably interlocked to the fixed roof in the closed position and during the opening process of the wind deflector strip, and this interlock is only released when the lowering motion for a sliding motion to the rear begins.

Another advantageous embodiment calls for the lowering mechanism on the rear slide element to include a lever guided in an auxiliary guide which is secured to the roof and which forces a forward component of motion on the rear edge of the sliding cover during lowering. In this configuration of the mechanism, the rear edge of the sliding cover can be configured such that it partially overlaps the bordering edge of the fixed roof. Since lowering the sliding cover takes place only when the wind deflector strip is completely opened, on the front edge of the sliding cover, after completely raising the wind deflector strip, there is enough free space for this swinging motion. It is, furthermore, advantageous for a lowering mechanism of this type that the lever thereof has a control pin which, interacting with a raising crank secured to the roof, forces a pin joined to the sliding cover into the auxiliary guide when the sliding cover is moved out of the open into the closed position.

These and further objects, features and advantages of the present invention will become apparent from the following description when consider together with the accompanying figures of the drawings which, for purposes of illustration only, show a single embodiment in accordance with the present invention.

DETAILED DESCRIPTION OF THE PREFERRED EMBODIMENT

Figure 1:
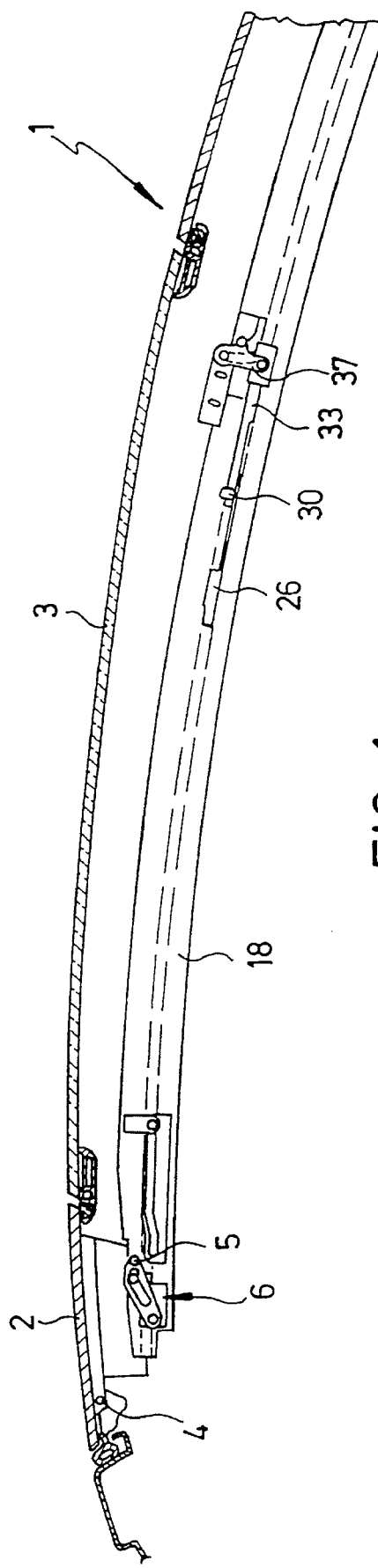
FIG. 1 is a schematic longitudinal section of a preferred embodiment, two cover element vehicle roof with both cover elements closed.

FIG. 1 shows a vehicle roof designated I as a whole, in which a roof opening is provided which can be selectively closed or at least partially exposed by means of two cover elements 2, 3. In the illustrated preferred embodiment, these cover elements are formed by a wind deflector strip 2 and a sliding cover 3 which is located behind it relative to a forward direction of vehicle travel. Wind deflector strip 2, near its forward edge, has a pivot axis forming axle pin 4 by which wind deflector strip 2 is hinged to the fixed vehicle roof at lateral sides of the roof opening.

Additionally, at each lateral side of the wind deflector 2, it is joined to a raising mechanism 6 via a pin 5 which is located near the rear edge of the wind deflector strip 2. The raising mechanism 6 comprises a raising lever 7 which is hinged on an end opposite the pin 5 to a front auxiliary slide element 13 by means of a pivot pin 12. Between pins 5 and 12, raising lever 7 has a lengthwise running crank slot 8 into which a slide block 9 slidingly fits (see FIGS. 4 & 7). Slide block 9 is laterally joined by a pin 10 to a pillow block 11 which is laterally attached to the fixed vehicle roof.

Front auxiliary slide element 13 is movably guided in a guide rail 18 which runs along lateral sides of the roof opening in the longitudinal direction of the vehicle. Slide element 13 has a slot 14 which runs vertically perpendicularly to the direction of movement in guide rail 18 and in which locking block 15 is supported to move perpendicularly to guide rail 18. The top of front locking block 15, on its surface which faces in a forward direction of travel, has upper a control flank 16 which is sloped obliquely to the rear, and underneath has a lower control flank 17 which is, likewise, sloped obliquely to the rear.

A front slide element 20 is located in guide rail 18 behind the front auxiliary slide element 13 relative to the forward direction of vehicle travel. Front locking block 15 is used for forced coupling and decoupling of the front auxiliary slide element 13 and the front slide element 20. When the roof is completely closed (FIG. 2), the front locking block couples the front auxiliary slide element 13 to the front slide element 20 due to its lower part being inserted down into a recess 21 of front slide element 20. In this case, part of the guide rail 18 adjoins the upper surface of front locking block 15 and prevents upward movement of the front locking block 15. When front slide element 20 and front auxiliary slide element 13 coupled to it move to the rear into the position shown in FIG. 4, a recess 19 which is provided in guide rail 18, conversely, enables upward movement of the front locking block 15, which is caused by a control surface on front slide element 20 (shown at the front edge of the recess 21 in FIG. 4) interacting with the lower control flank 17. After forced raising of front locking block 15 and its complete engagement within the recess 19, a locking slide 22, which is provided on the front slide element 20, becomes active; it is directed horizontally transversely with respect to the direction of movement of front auxiliary slide element 13 and is moved under locking block 15 by the action of a spring 45 to prevent the locking block 15 from moving down again. The locking slide 22 is further described in detail below in conjunction with FIG. 7.

Connected to the bottom of the sliding cover 3, near the forward edge thereof, is a front cover carrier 23 in which there is a guide pin 24. Pin 24 fits into control slot 25 which is provided in the front slide element 20. Control slot 25 is composed of a straight section 25A which runs parallel to the guide rail 18 and an angled section 25B which is sloped obliquely upward toward the rear opening into the straight section 25A. Section 25A represents an idle path which is traversed by pin 24 as the front slide element 20 moves rearwardly relative to it during the process of raising the wind deflector strip 2. Based on the parallel arrangement of straight section 25A with respect to guide rail 18, there is still no lowering of the front edge of sliding cover 3 in this area. This occurs only upon subsequent movement of the front slide element 20 to the rear causing the pin 24 to follow the sloped section 25B. Front slide element 20 is joined to a conventional threaded drive cable 27 which is guided in a channel of guide rail 18 and can be displaced by the cable under the action of a manual or motor drive.

Figure 3:
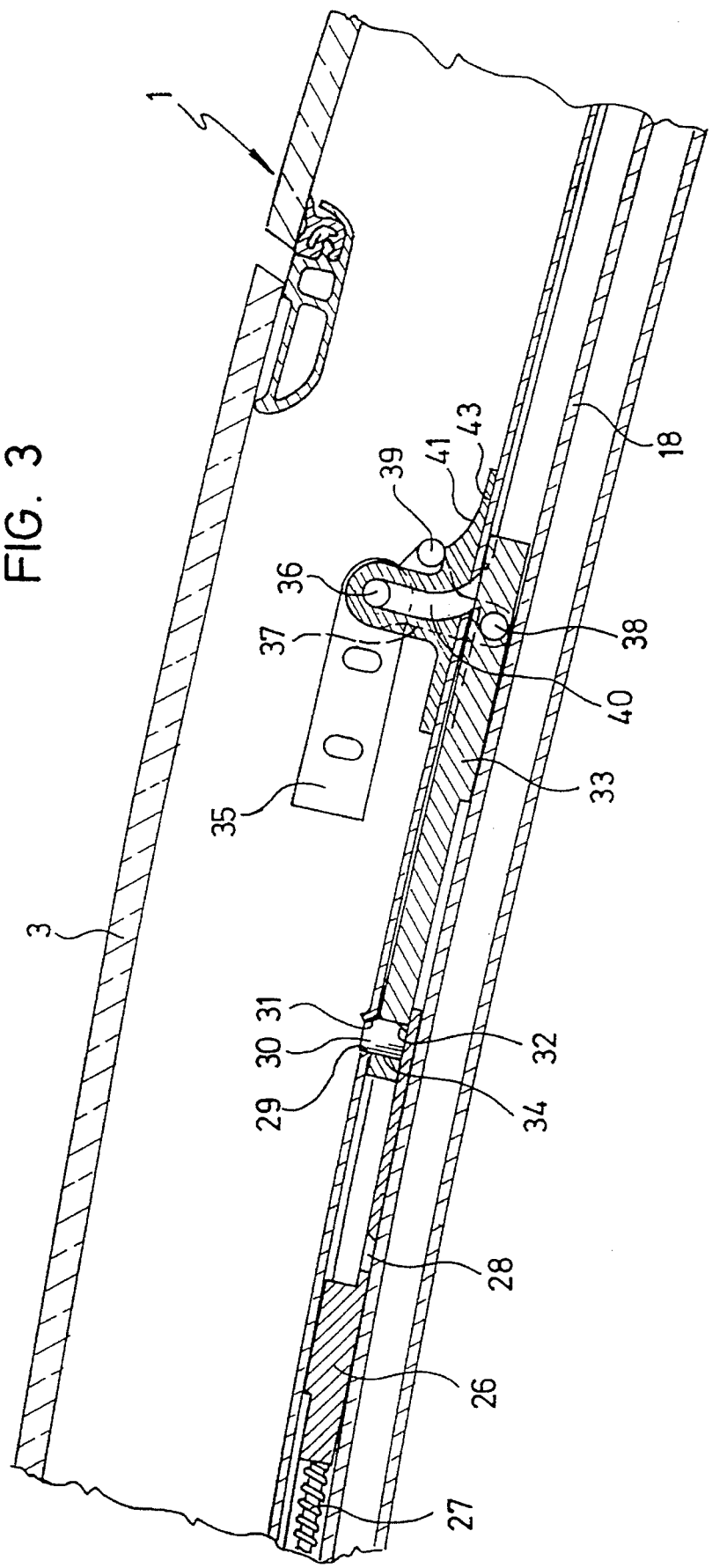
FIG. 3 is a side sectional view showing the lowering mechanism of the sliding cover with the rear slide element when the roof is closed.
Figure 6:
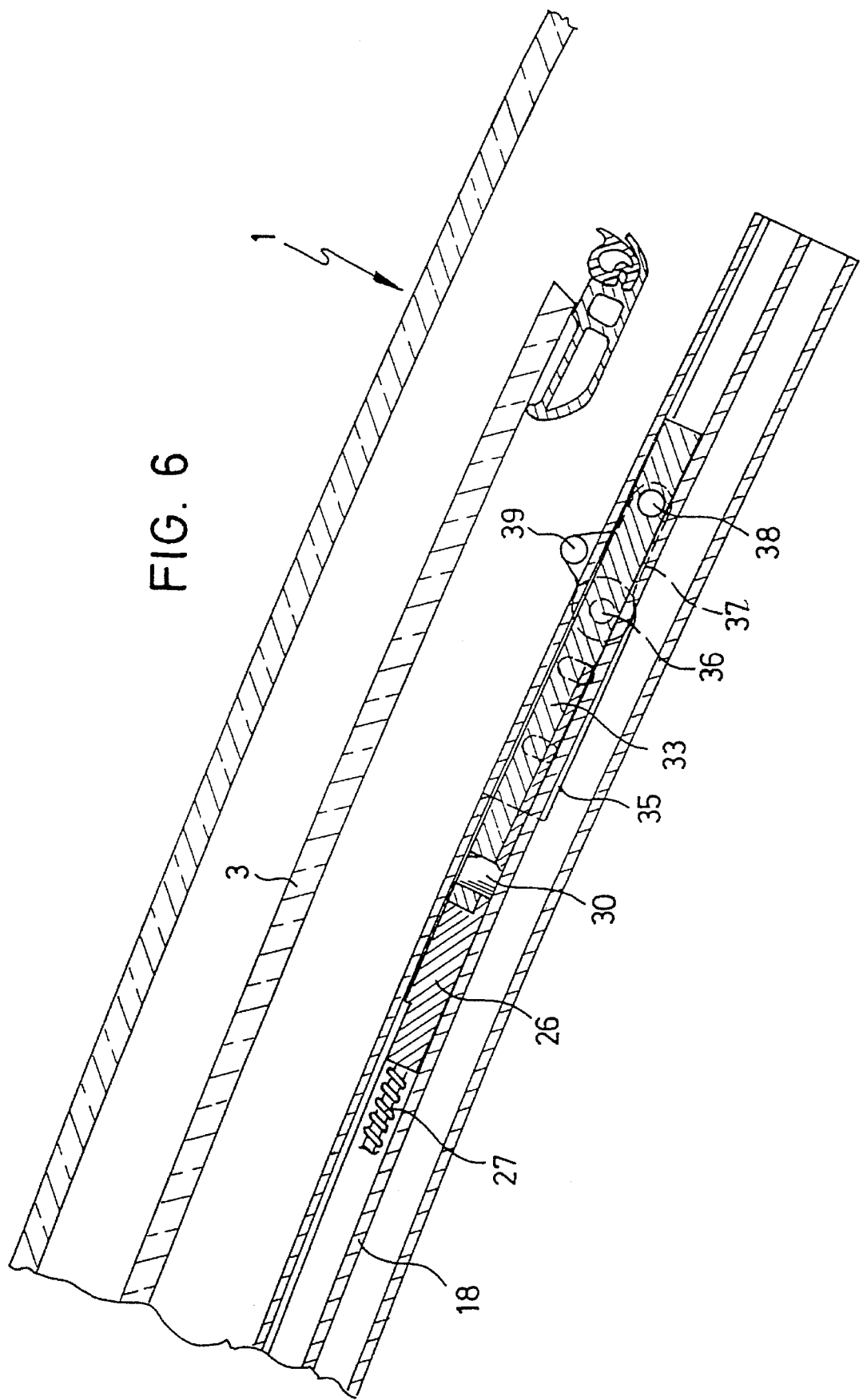
FIG. 6 is a view similar to that of FIG. 5, but with the sliding cover completely lowered and partially moved to the rear.

As shown in FIGS. 3 & 6, the drive cable 27 is, also, attached to a rear auxiliary slide element 26, which is, likewise, located in guide rail 18 to move in the longitudinal direction of the vehicle. Behind rear auxiliary slide element 26 (relative to the forward direction of travel) is a rear slide element 33 to which a lowering mechanism for sliding cover 3 is connected. Rear slide element 33 has a slot 34 which runs vertically perpendicular with respect to guide rail 18 and in which there is rear slide block 30 which can move vertically perpendicular to the direction of movement of rear slide element 33. When the roof is completely closed (FIG. 3), the upper part of rear locking block 30 fits in a recess 29 which is provided in guide rail 18. Since the middle area of locking block 30, simultaneously, engages the rear slide element 33 of the sliding cover 3, the rear locking block 30 couples the cover 3 and sliding element 33 to the fixed vehicle roof I preventing sliding movement in guide rail 18.

Figure 2:
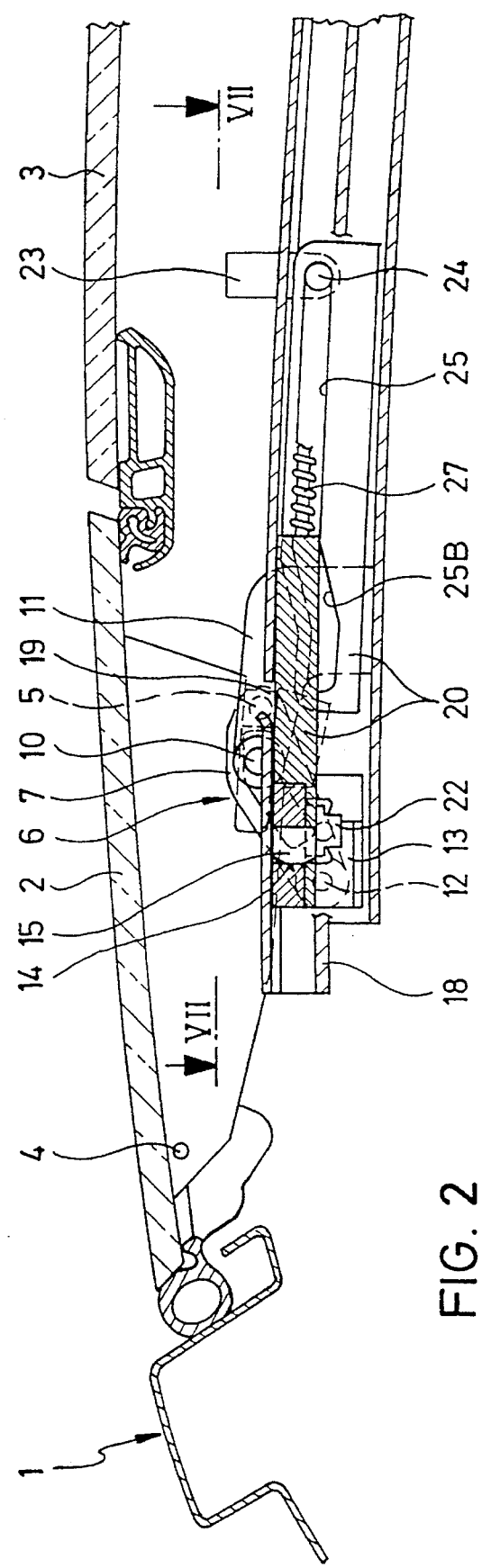
FIG. 2 is a side sectional view showing the raising mechanism of the wind deflector strip and the front slide element of the sliding cover when the roof is fully closed.
Figure 4:
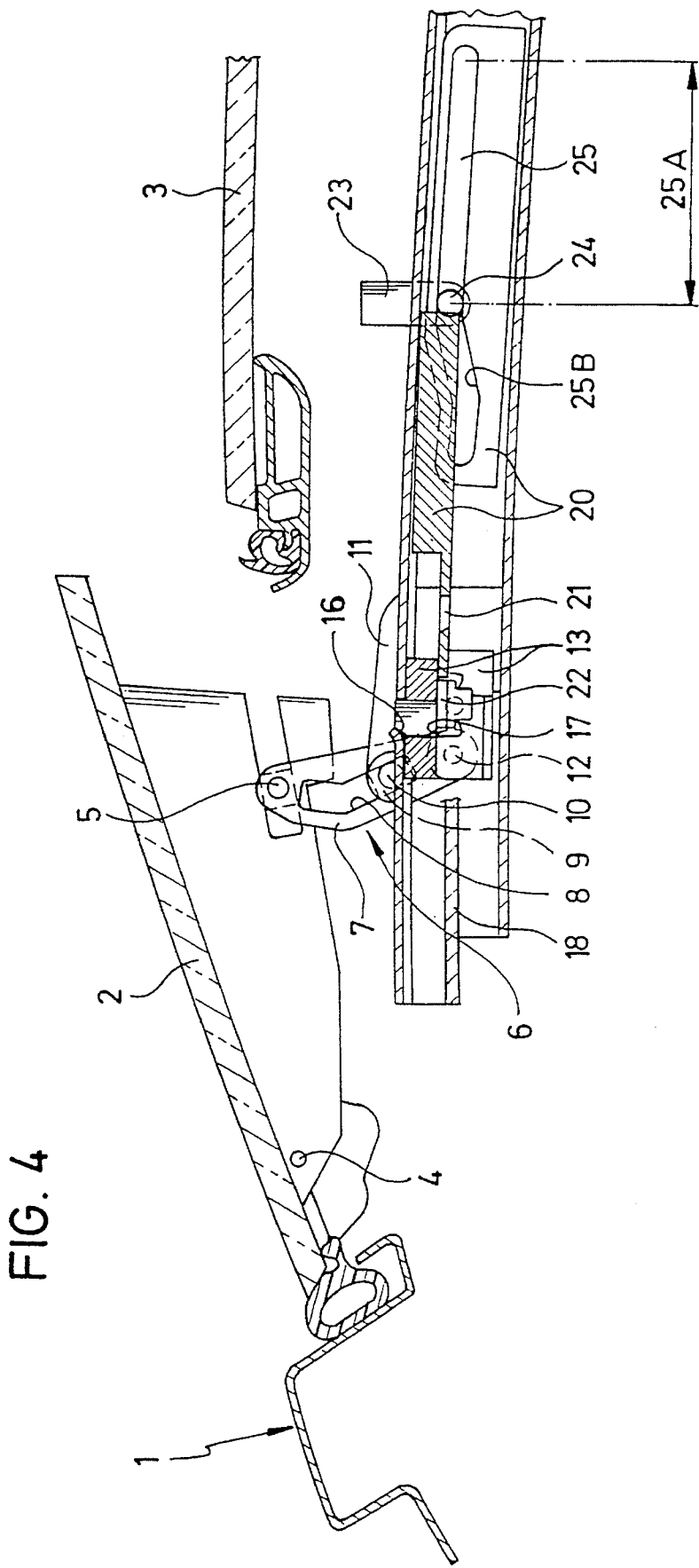
FIG. 4 is a view similar to that of FIG. 2, but with the wind deflector strip completely raised and the sliding cover closed.

When rear auxiliary slide element 26 is displaced, which takes place due to the connection to same drive cable 27, at the same time with the displacement of front auxiliary slide element 13 from the position shown in FIG. 2 into the position shown in FIG. 4, the recess 28 which is provided in rear auxiliary slide element 26 travels rearwardly moving under rear locking block 30 such that the latter, as soon as rear auxiliary slide element 26 touches the rear slide element 33, is forced to move down by the upper control flank 31 (which is sloped obliquely forward and which lies on the top rear corner of the rear locking block 30 relative to the forward direction of travel) engaging a complementary control flank on the rear edge of the recess 29. In doing so, rear locking block 30 releases the connection between rear slide element 33 and guide rail 18, and at the same time, couples the rear slide element 33 to the rear auxiliary slide element 26.

Sliding cover 3, near its rear edge, is provided on the bottom with a rear cover carrier 35 to which a guide pin 36 is attached. The guide pin 36 is hinged to a lever 37 which is pivotally supported at its opposite end, via a pin 38 in rear slide element 33. Lever 37 also has a control pin 39 which interacts with a lifting link guide 41 which is secured to the fixed roof and which is located jointly with a stop 42 that is located in the closed position under control pin 39 on control part 43 which is joined to guide rail 18. Control part 43, furthermore, has a control slot 40 which runs in an arc downwardly from the top to the rear and which guides pin 36.

Figure 5:
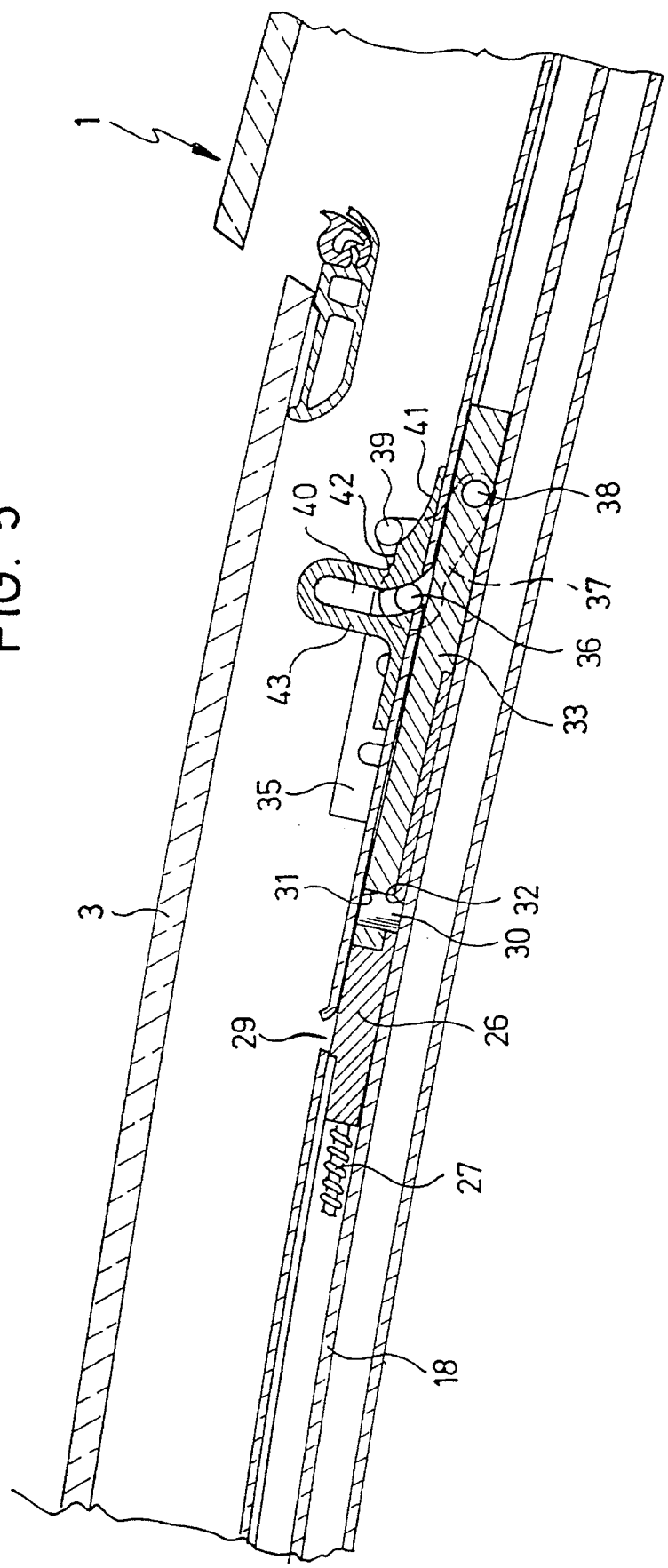
FIG. 5 is a view similar to that of FIG. 3, but with the rear edge of the sliding cover partially lowered.

When rear slide element 33 moves from the position shown in FIG. 3 into the position shown in FIG. 5, rear slide element 3, which for its part is pushed to the rear by rear auxiliary slide element 26, pulls pin 38 to the rear. Control slot 40 forces a component of motion pointed forward on the rear edge of sliding cover 3 via pin 36 and rear cover carrier 35. At the same time, the front edge of sliding cover 3 is moved down by sloped section 25B and pin 24 which fits into the latter. After lever 37 has been pivoted completely down, the pins 38 and 36 are guided in the guide rail 18 at the same height (see FIG. 6, where a position where sliding cover 3 has been moved partially to the rear is shown), and sliding cover 3 is lowered far enough to be moved to the rear under fixed vehicle roof 1. Control pin 39 is slid downward on the lifting link guide 41 in this process.

Figure 7:
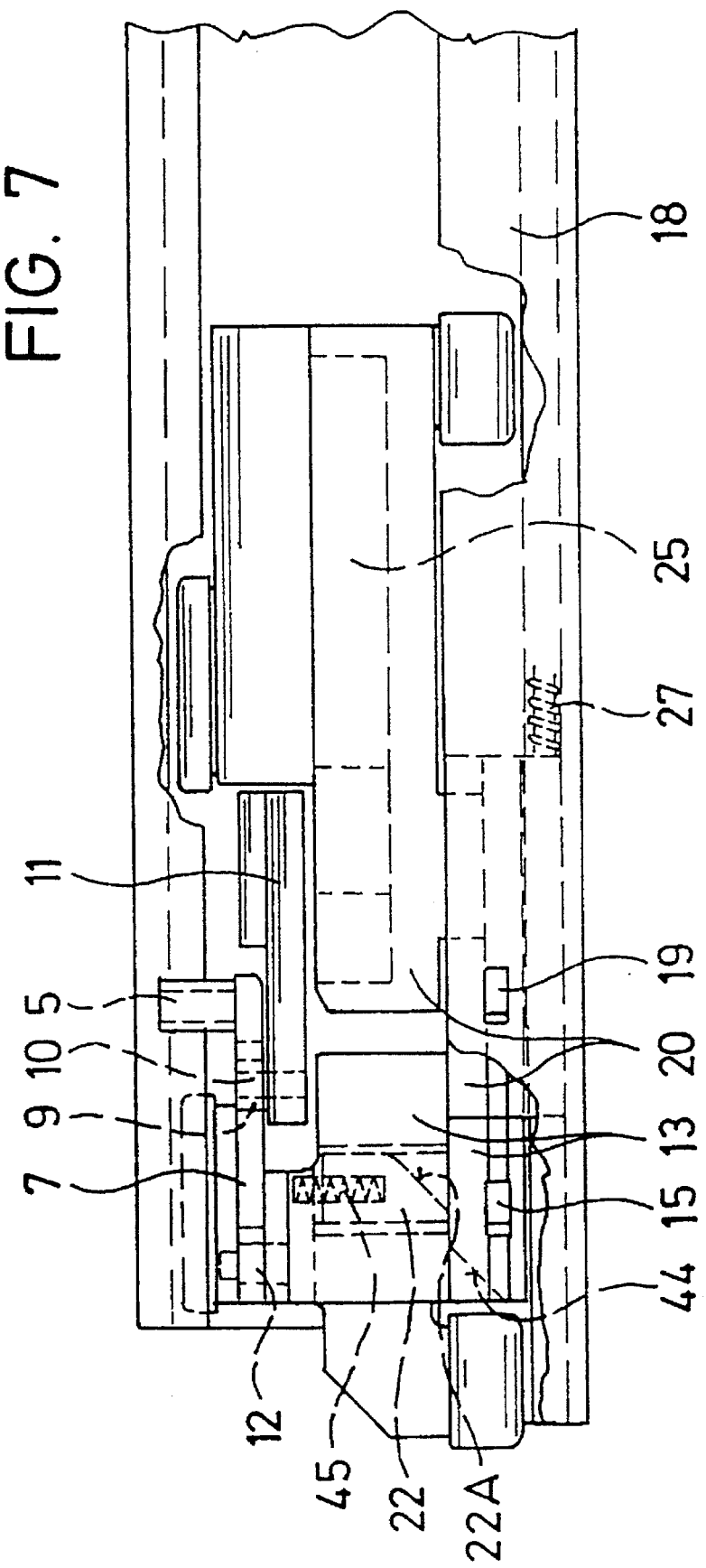
FIG. 7 a view taken along line VII—VII in FIG. 2 to illustrate the front auxiliary slide element and the front slide element as well as a bolt slide which interacts with the front locking block.

FIG. 7 shows front slide element 20 and front auxiliary slide element 13 with wind deflector strip 2 closed and sliding cover 3 closed, in an overhead view. In this position, front locking block 15 couples front auxiliary slide element 13 to front slide element 20. locking slide 22 is spring-pretensioned by compression spring 45 in the direction toward locking block 15. When wind deflector strip 2 is moved into the raised position, front slide element 20, via locking block 15, pulls front auxiliary slide element 13 to the rear (i.e., to the right in FIG. 7) until locking block 15 travels to under recess 19 in guide rail 18. Here, the locking block 15 is forced by lower control flank 17 upwards to engage recess 19 as front slide element 20 continues to move. Sloped control surface 44, which is provided on the front of a projecting part of front slide element 20, enables control surface 22A (which is beveled complementarily to the first control surface 44 on locking slide 22) to move toward the locking block 15 under the pressure of compression spring 45 as slide 22 moves rearward until finally the locking slide 22 reaches under the locking slide 15, is keeping it engaged in recess 19. As front slide element 20 moves forward, control surface 44 presses the slide 22 inward against the spring pressure, via control surface 22A, so that it again releases locking slide 15, permitting it to move downward for coupling together of the front auxiliary slide element 13 and the front slide element 20.

In the following, an opening and closing process of the vehicle roof is described. When the vehicle roof is completely closed, rear locking block 30 couples rear slide element 33 with guide rail 18 by engaging in recess 29. Front locking block 15, at the same time, couples front auxiliary slide element 13 to front slide element 20 by engaging in its recess 21. If, at this point, the drive which is not shown moves drive cable 27 to the rear, i.e., to the right in the drawings, front slide element 20 pulls front auxiliary slide element 13 to the rear. In this case, raising lever 7 provides for raising of the rear edge of wind deflector strip 2 into the position shown in FIG. 4 by moving pin 12 to the rear and by simultaneous engagement of slide block 9, which is hinged to fixed pillow block 11, into the guide slot 8. At the same time, front slide element 20 traverses an idle path which corresponds to straight section 25A opposite pin 24. By being simultaneously joined to same drive cable 27, in the same time interval, rear auxiliary slide element 26 is moved by the same path to the rear onto rear slide element 33.

As soon as front locking block 15 has arrived under recess 19 in guide rail 18 and rear locking block 30 over recess 28 in rear auxiliary slide element 26, they are forced to move into these recesses 19, 28. In this case, front locking block 15 cancels the coupling between front auxiliary slide element 13 and front slide element 20, and at the same time, couples front auxiliary slide element 13 to guide rail 18. Wind deflector strip 2 is interlocked securely to the guide rail in this way in the completely raised position shown in FIG. 4.

At the same time, rear locking block 30 cancels the interlock of rear slide element 33 to guide rail 18 and couples rear slide element 33 to rear auxiliary slide element 26. As movement to the rear continues, the lowering mechanism on the rear edge of the cover takes effect in the manner described above. In this phase, the rear auxiliary slide element 26 pushes rear slide element 33 to the rear until sliding cover 3 has moved completely under the rear part of fixed vehicle roof 1.

In the closing process, the rear auxiliary slide element 26 is coupled to the rear slide element 33 by means of the rear locking block 30 and pulls rear slide element 33 forward, at the same time, until recess 29 in guide rail 18 enables deflection of rear locking block 30 upward. In this position, the lower control flank 32, which is sloped obliquely forward on the bottom rear flank of rear locking block 30, is forcefully pressed up by a surface complementary to flank 32 on rear auxiliary slide element 26. In this way, the rear locking block 30 is forced to decouple from the rear auxiliary slide element 26, and at the same time, again, couples the rear slide element 33 in the recess 29 in guide rail 18.

Before this takes place, to raise the rear edge of the cover, control pin 39 is run up onto the lifting link guide 41 secured to the roof, and in doing so, inserts pin 36 into the control slot 40. In this way, the cover rear edge supporting lever 37, on which pin 36 is located, is forced to swivel up as pin 38 continues to be pulled forward. Since, at the same time, the front slide element 20 is moved forward by the corresponding amount due to coupling with same drive cable 27, parallel thereto, the front edge of the cover is raised via movement of pin 24 along sloped section 25B of the control slot 25.

At the same time that rear locking block 30 is decoupled from rear auxiliary slide element 26, front locking block 15 is decoupled from recess 19 in guide rail 18. This takes place by the fact that front slide element 20 touches front auxiliary slide element 13, upper control flank 16 being pressed downward by the upturned front flank of recess 19 and which is shaped complementarily to control flank 16 (see FIG. 4). At the same time, locking block 22 is shifted to a position which enables locking block 15 to move downward into recess 21 in front of slide element 20. Thus, front auxiliary slide element 13 and front slide element 20, during further movement forward, are again forced to couple with one another during further movement to the front to lower wind deflector strip 2.

With the above described vehicle roof, it is easily possible to trigger two cover elements independently of one another, but forcefully by means of a single drive.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Vehicle roof with two cover elements which selectively close and at least partially expose a roof opening in a fixed vehicle roof, said cover elements comprising a front cover element in the form of a wind deflector strip which is mounted to pivot around a pivot axis located near a front edge thereof and which is connected to a raising mechanism for raising of a rear edge of the wind deflector strip above the fixed vehicle roof, and a rear cover element in the form of a sliding cover which is lowerable below the fixed vehicle roof by means of a lowering mechanism and which can be moved under the fixed vehicle roof on slide elements which are movable along guide rails which are secured to the fixed vehicle roof; wherein the wind deflector strip and sliding cover are actuated by means of a common drive; wherein the sliding cover has front and rear slide elements to which the lowering mechanism is coupled; wherein front and rear auxiliary slide elements are provided which are movable relative to the front and rear slide elements, respectively, and which are automatically coupleable and decouplable with the respective slide element and with respect to a part secured to the fixed vehicle roof by means of respective front and rear locking blocks which are movable perpendicularly relative to directions of movement of the respective slide element; and wherein the raising mechanism for wind deflector strip is automatically coupled and decoupled to the front slide element by the front locking block.

2. Vehicle roof according to claim 1, wherein the front slide element is provided with a guide for the lowering mechanism of the sliding cover, said guide having an idle path.

3. Vehicle roof according to claim 1, wherein the front locking block interlocks the front auxiliary slide element with the front slide element when the roof is completely closed, and releases the interlock and interlocks the front auxiliary slide element with the part which is secured to the fixed vehicle roof when the wind deflector strip is fully raised.

4. Vehicle roof according to claim 3, wherein the rear locking block interconnects the rear slide element with the part secured to the fixed vehicle roof when the sliding cover is completely closed, and releases the interconnection and interconnects the rear auxiliary slide element with rear slide element when wind deflector strip is fully raised.

5. Vehicle roof according to claim 2, wherein the lowering mechanism further comprises a lever on the rear slide element which is guided in an auxiliary guide which is secured to the fixed vehicle roof and which applies a component of motion on the rear edge of sliding cover during lowering thereof.

6. Vehicle roof according to claim 5, wherein said lever of the lowering mechanism has a control pin which interacts with a lifting link guide secured to the fixed vehicle roof for forcing a pin joined to sliding cover into the auxiliary guide when the sliding cover is moved from an open position into a closed position.

7. Vehicle roof according to claim 2, wherein the front locking block interlocks the front auxiliary slide element with the front slide element when the roof is completely closed, and releases the interlock and interlocks the front auxiliary slide element with the part which is secured to the fixed vehicle roof when the wind deflector strip is fully raised.

8. Vehicle roof according to claim 7, wherein the rear locking block interconnects the rear slide element with the part secured to the fixed vehicle roof when the sliding cover is completely closed, and releases the interconnection and interconnects the rear auxiliary slide element with rear slide element when wind deflector strip is fully raised.

9. Vehicle roof according to claim 1, wherein the lowering mechanism comprises a lever on the rear slide element which is guided in an auxiliary guide which is secured to the fixed vehicle roof and which applies a component of motion on the rear edge of sliding cover during lowering thereof.

10. Vehicle roof according to claim 9, wherein said lever of the lowering mechanism has a control pin which interacts with a lifting link guide secured to the fixed vehicle roof for forcing a pin joined to sliding cover into the auxiliary guide when the sliding cover is moved from an open position into a closed position.

* * * * *